July 15, 1969  A. HEYROTH  3,455,025
DEVICE FOR THE TRANSMISSION OF MOTION
IN A PHOTOGRAMMETRIC APPARATUS
Filed Oct. 1, 1964

INVENTOR
ALEXANDER HEYROTH
BY
Nolte & Nolte
ATTORNEYS

United States Patent Office 3,455,025
Patented July 15, 1969

3,455,025
DEVICE FOR THE TRANSMISSION OF MOTION IN A PHOTOGRAMMETRIC APPARATUS
Alexander Heyroth, Jena, Germany, assignor to VEB Carl Zeiss Jena, Jena, Germany
Filed Oct. 1, 1964, Ser. No. 400,958
Int. Cl. G06g 7/78; G01c 11/00; G09b 29/10
U.S. Cl. 33—1                                3 Claims

---

ABSTRACT OF THE DISCLOSURE

The invention refers to photogrammetric apparatus in which one or a plurality of levers maintain the projective relations and in this manner effect transmission of motion between image plane and model plane. One end of each lever is guided and the other end controls the slide. To avoid deformations of a lever in the simplest manner possible, a measuring transformer having a feeler pin is fixed to the slide. The other end of each lever is linked to the feeler pin of each transformer. When the lever is being guided, the feeler pin induces a voltage in the measuring transformer which causes a motor to displace the slide.

---

The present invention is concerned with a device for the transmission of motion in a photogrammetric plotting or rectifying apparatus which has at least one fulcrumed lever, the one end of the lever being guided and the other end of the lever controlling and via an automatic control device displacing a slide.

Photogrammetric plotting apparatus are known in which electric following mechanisms maintain the relation of image plane to model plane. If these mechanisms are incited photoelectrically, it is necessary to use considerable electronics, which does not however make for maximum reliability and precision. Far less electronics are needed in another known apparatus, in which the following mechanism is incited by switch boxes. The requirement however of installing a considerable quantity of mechanical elements between the guiding end of the lever and the guided slide, and the fact that these two parts are not at one and the same height, incurs the expense of elaborate construction and much material, a further disadvantage being that unavoidable backlash and tilts will give rise to incorrect guiding.

It is an object of the present invention to avoid such considerable display of electronics, construction and material and at the same time to increase the reliability of the measurements by eliminating backlash and tilts between the guiding end of the lever and the guided slide.

Accordingly, the present invention provides that the lever is rigidly connected to the feeler pin of an electric transducer of the following control and together with this feeler is displaceable by small amounts in the direction of the motion of the slide carrying the transformer. Thus the pivotal point of the lever on the slide is a floating one, and the Abbé comparator principle, which admits only errors of the second order, is maintained. Since a rotation of the lever slightly displaces the fulcrum of the lever at the slide relatively to this slide, the fulcrum may be called a floating one. The apparatus according to the present invention is applicable in any lever-operated image-measuring apparatus for plotting and restifying photograms.

It is advantageous to use an electric transducer of the progressive type. If the lever is linked cardanically to a system of cross-slides of the photogrammetric plotting apparatus, the geometrical axes of the feeler pins coincide with the Cardan axes, the Cardan axes being parallel to the directions of slide motion. Accordingly, the linkage is a floating joint.

In order that the invention may be more readily understood, reference is made to the accompanying drawing, which illustrates diagrammatically and by way of example two embodiments thereof and in which.

Figure 1:
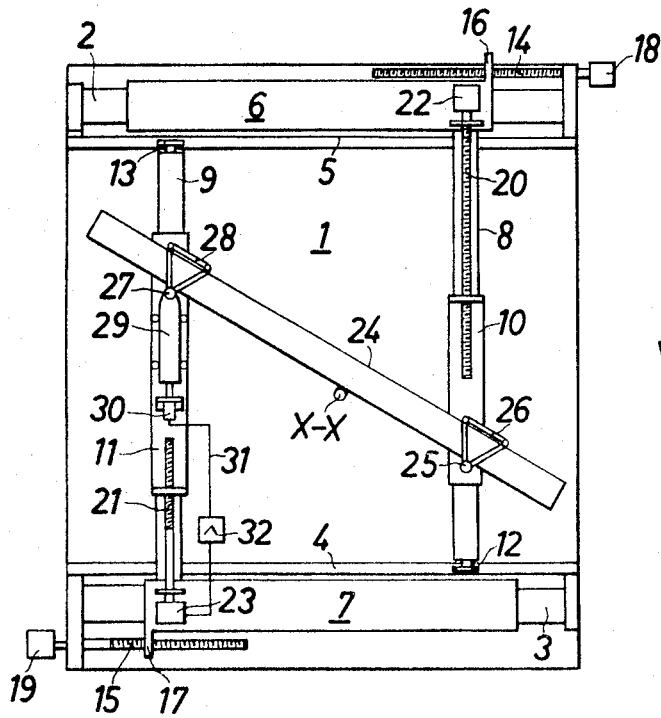
FIG. 1 is the top view of device for the transmission of motion.

In FIG. 1, a base plate 1 carries two guideways 2 and 3 and two rails 4 and 5, all being parallel to each other and to two opposite sides of the base plate 1. Slides 6 and 7 are displaceable along the guideways 2 and 3. The slide 6 is fast with and at right angles to a bridge 8, and the slide 7 is fast with and at right angles to a bridge 9. The bridges 8 and 9 carry respectively slides 10 and 11 displaceable at right angles to the slides 6, 7. The free ends of the bridges 8 and 9 carry respectively rollers 12 and 13, the roller 12 running on the rail 4, and the roller 13 on the rail 5.

Displacement of the slides 6 and 7 is effected, respectively, by spindles 14 and 15 mounted on the base plate 1. The spindle 14 engages a nut 16 and is rotatable by an electric motor 18. The spindle 15 engages a nut 17 and is rotatable by an electric motor 19. The slides 10 and 11 are engaged respectively by spindles 20 and 21 which are mounted on the slides 6 and 7 and actuated by electric motors 22 and 23. Alternately the spindles 14 and 20 can be actuated through hand wheels (not shown).

On the base plate 1, a lever 24 fulcrums about an axle X—X. The lever 24 by means of a shear 26 is pivoted at a point 25 on the slide 10 and by means of a shear 28 is pivoted at a point 27 on the slide 11. The pivot 27 is the tip of the feeler pin 29 of an inductive fine feeler 30, the transducer, which is mounted on the slide 11 and through an electric conductor 31 and an amplifier 32 controls the electric motor 23 operating the spindle 21.

If the lever 24 pivots in consequence of a displacement of the slides 6 and 8, this pivoting entails a slight displacement of the feeler pin 29 along the bridge 9. In consequence thereof, voltage proportional to this displacement is produced in the fine feeler 30 and directed through the amplifier 32 to the electric motor 23, which begins to operate in dependency on direction. The electric motor 23 rotates the spindle 21 until the lever 24 fulcrums about the axle X—X and the tip 29 is made to leave its zero position. The lever 24 thus serves only for guiding the slide 11 and not for displacing the slide 11 in dependence of the motion of the slide 10. When the feeler pin 29 is in zero position, the straight line connecting the points 25 and 27 intersects the axis X—X.

Figure 2:
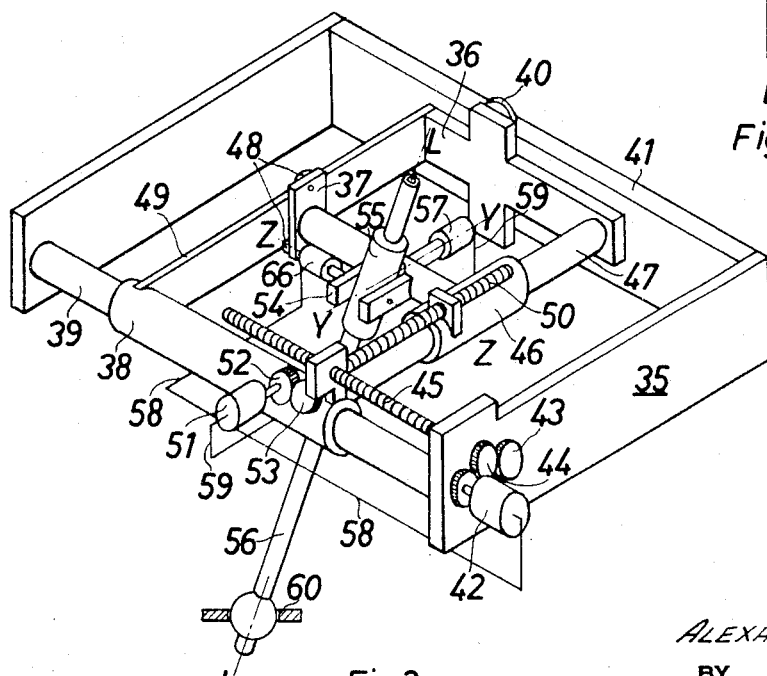
FIG. 2 is a perspective view of a cross-slide system of a photogrammetric plotting apparatus.

In FIG. 2, a frame 35 carries cross-slides 36, 37. The slide 36 by means of a sleeve 38 glides on a cylindric guide 39, and by means of rollers 40 (the drawing showing one only) is displaceable along prismatic guide 41 on the frame 35. Displacement of the slide 36 is effected by an electric motor 42 which is fast with the frame 35 and through a pair of spur gears 43, 44, operates a spindle 45 which is rigidly keyed to the gear 44 and mounted in the frame 35 and engages the slide 36. The slide 37 is fast with a sleeve 46 displaceable along a cylindric guide 47 and has rollers 48 running on a cylindric guide 49. A spindle 50 mounted on the slide 36 and engaging the slide 37 is operated via a pair of bevel gears 52, 53 by an electric motor 51 which is fast with the slide 36.

In a U-shaped bearing 54 mounted on the slide 37 and rotatable about an axis Y—Y, a cylindrical guide body 55 is rotatable about an axis Z—Z at right angles to the axis Y—Y. A lever 56 cardanically mounted in a joint 60 glides in the guide body 55. The geometrical axis L—L after rotation of the lever 56 always contains the point of intersection of the axes Y—Y and Z—Z. The axle journals of the U-shaped bearing 54 and the cylindric guide body 55 are the feeler pins of measuring transformers 66, 57, which can be inductive fine feelers and which by means of cables 58, 59 and interposed amplifiers (not shown) are connected to the electric motors 42 and 51.

Unlike FIG. 1, in which the lever and slides are displaceable in a plane, FIG. 2 shows a lever rotatable in space. Moreover, the lever and the cross-slide are disposed for motion in planes including angles other than 0°. In FIG. 2, a force acting against the lower end of the lever 56 is transmitted by this lever to the U-shaped bearing 54 and the cylindric guide body 55, in consequence whereof the journals containing the axes Y—Y and Z—Z are displaced along the said axes. These displacements are very small, because the moment a displacement is imparted to the journals, which are identical with the feeler pins, voltages are induced in the measuring transformers 66, 57 and these voltages pass through amplifiers (not shown) and the cables 58, 59, thus exciting the control motors 42 and 51. The pairs of spur gears 43, 44 and 52, 53 and the spindles 45 and 50 displace the cross-slides 36, 37 as long as any force acts against the lower end of the lever 56, or, in other words, as long as the geometrical axis L—L of the lever 56 and the axes Y—Y and Z—Z do not intersect but slightly pass each other.

Figure 3:
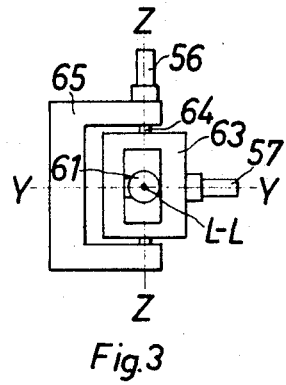
FIGS. 3 and 4 show in cross-section and elevation, respectively, the lever pivoted to the cross-slide system.
Figure 4:
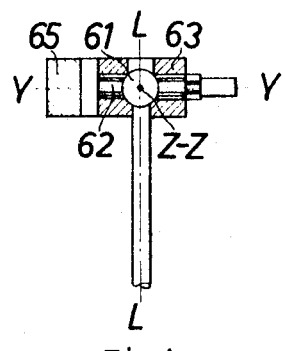

The lever 56 can either glide in a cylindric guide body 55, as shown in FIG. 2, or can be cardanically linked by means of a ball 61 to the system of cross-slides, as shown in FIGS. 3 and 4. In the latter case, the ball 61 is rigidly connected to the feeler pin 62 of the transducer 57, which coincides with the axis Y—Y. Together with the pin 62, the ball 61 is displaceable by small amounts along the axis Y—Y in an annular bearing body 63. The bearing body 63 is rigidly connected to the feeler pin 64 of the measuring transformer 66, which coincides with the axis Z—Z. The pin 64 and the bearing body 63 are mounted in a bracket 65 and displaceable by small amounts.

I claim:
1. A device for the transmission of motion in a photogrammetric apparatus, comprising:
   a lever fulcrumed on at least one axis,
   means for rotating said lever about said axis,
     said means being attached to the one end of said lever,
   a carrier for a system of two cross sides,
   at least one electric measuring transformer on one of said slides,
   said measuring transformer being provided with a feeler pin mounted for displacement parallel to the rotation plane of said lever,
   the other end of said lever being linked to said feeler pin,
   said lever when rotated inducing together with said feeler pin a voltage in said measuring transformer,
   a first spindle,
     said first spindle being mounted on said carrier and engaging that of said slides which does not carry said measuring transformer,
   a second spindle,
     said second spindle being mounted on that of said slides which does not carry said measuring transformer and engaging the other of said slides,
   a first electric motor,
     said first electric motor being mounted on said carrier and actuating said first spindle,
   and a second electric motor,
     said second electric motor being mounted on that of said slides which does not carry said measuring transformer and actuating said second spindle and being controlled by the voltage induced in said measuring transformer.

2. A device as claimed in claim 1, wherein the rotations of said lever and the displacements of said system of cross slides take place in planes at right angles to the axis of rotation of said lever and parallel to each other.

3. A device as claimed in claim 1, wherein said lever is cardanically mounted and a second measuring transformer and said first measuring transformer are so mounted on the same slide of said system of cross slides that the prolongations of said feeler pins intersect at a point coinciding with the linkage point of said lever on said system of cross slides, said second measuring transformer controlling said first electric motor.

References Cited

UNITED STATES PATENTS 1,151,996   8/1915   Bauersfeld.
2,785,599   3/1957   Sonnberger et al.

FOREIGN PATENTS 708,679   5/1931   France.

WILLIAM D. MARTIN, JR., Primary Examiner

U.S. Cl. X.R.

33—20